US010721642B2

United States Patent
Kwon

(10) Patent No.: US 10,721,642 B2
(45) Date of Patent: Jul. 21, 2020

(54) SYSTEM AND METHOD FOR INDICATING CHANNEL ASSESSMENT INFORMATION

(71) Applicant: NEWRACOM, Inc., Lake Forest, CA (US)

(72) Inventor: Young Hoon Kwon, Laguna Niguel, CA (US)

(73) Assignee: NEWRACOM, Inc., Lake Forest, CA (US)

( * ) Notice: Subject to any disclaimer, the term of this patent is extended or adjusted under 35 U.S.C. 154(b) by 0 days.

(21) Appl. No.: 16/162,896

(22) Filed: Oct. 17, 2018

(65) Prior Publication Data
US 2019/0053083 A1    Feb. 14, 2019

Related U.S. Application Data

(63) Continuation of application No. 14/944,417, filed on Nov. 18, 2015, now Pat. No. 10,136,346.
(Continued)

(51) Int. Cl.
*H04W 24/08* (2009.01)
*H04L 12/26* (2006.01)
(Continued)

(52) U.S. Cl.
CPC ............. *H04W 24/08* (2013.01); *H04L 43/16* (2013.01); *H04W 74/0808* (2013.01); *H04W 84/12* (2013.01)

(58) Field of Classification Search
CPC . H04W 74/0808; H04W 24/08; H04W 84/12; H04L 43/16; H04L 5/006; H04L 5/00; H04L 12/26
See application file for complete search history.

(56) References Cited

U.S. PATENT DOCUMENTS

| 2011/0064038 A1* | 3/2011 | Kuo | H04W 28/18 370/329 |
| 2016/0007274 A1* | 1/2016 | Park | H04W 48/16 455/434 |

(Continued)

OTHER PUBLICATIONS

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.
(Continued)

*Primary Examiner* — Abdelillah Elmejjarmi
(74) *Attorney, Agent, or Firm* — NDWE LLP

(57) ABSTRACT

The embodiments provide a method implemented by a network device in a wireless local area network (WLAN) to provide a deferred clear channel assessment (CCA) from a physical layer to an upper layer within the network device. The deferred CCA enables the upper layer to make a final decision on the state of a wireless medium. The method identifies at least one condition on a wireless medium where an upper layer decision is required to determine a state of the wireless medium, and passes on requisite data to the upper layer to enable a decision on the state of the wireless medium. The deferred CCA process supports more complex CCA processes that may rely on information available in an upper layer.

20 Claims, 9 Drawing Sheets

Related U.S. Application Data

(60) Provisional application No. 62/086,989, filed on Dec. 3, 2014.

(51) Int. Cl.
*H04W 74/08* (2009.01)
*H04W 84/12* (2009.01)

(56) References Cited

U.S. PATENT DOCUMENTS

| | | | | |
|---|---|---|---|---|
| 2016/0014807 A1* | 1/2016 | Ghosh | ............ | H04L 5/0058 370/329 |
| 2016/0081010 A1* | 3/2016 | Seok | ............ | H04W 74/0816 370/329 |
| 2016/0128099 A1* | 5/2016 | Liu | ............ | H04W 74/0808 370/329 |

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

Non-Final Office Action from U.S. Appl. No. 14/944,417, dated Dec. 11, 2017, 16 pages.

Notice of Allowance from U.S. Appl. No. 14/944,417, dated Jul. 18, 2018, 7 pages.

\* cited by examiner

| Field | Description |
|---|---|
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |
| Data | The Data field carries the PSDU(s) |

SYSTEM AND METHOD FOR INDICATING CHANNEL ASSESSMENT INFORMATION

CROSS-REFERENCE TO RELATED APPLICATIONS

This application is a continuation of U.S. application Ser. No. 14/944,417, filed Nov. 18, 2015, which claims the benefit of U.S. Provisional Application No. 62/086,989, filed Dec. 3, 2014, which are hereby incorporated by reference.

FIELD OF INVENTION

The embodiments of the invention are related to the field of wireless local area network (WLAN) operation. More specifically, the embodiments of the invention relate to a method and system for augmenting clear channel assessment to provide additional information to an upper layer for resolving a state of a wireless medium. Other embodiments are also disclosed.

BACKGROUND

Institute of Electrical and Electronics Engineers (IEEE) 802.11 is a set of physical and media access control (MAC) specifications for implementing wireless local area network (WLAN) communications between a set of network devices referred to as stations and/or access points. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHs spacing dependent on the regulations of the respective country or territory.

Communication on any given channel of either the 2.4 GHz or the 5 GHz band between network elements of the WLAN utilizes the clear channel assessment (CCA) protocol. CCA is defined in the IEEE 802.11 standard as part of the Physical Medium Dependent (PMD) and Physical Layer Convergence Protocol (PLCP) layer. Clear Channel Assessment is composed of two related functions, carrier sense (CS) and energy detection (ED). The CCA protocol is implemented in the physical layer (PHY) of a network device and determines the current state of use of the wireless medium (WM) (i.e., a 2.4 GHz or 5 GHz band), such that a network device (e.g., a station) will access a channel of the WM only when the WM becomes idle.

The conventional CCA rule mechanism defined in IEEE 802.11 defines the primary channel to be busy, if one of the conditions listed in the Table I is met, otherwise the primary channel is considered to be idle. If the primary channel is idle, the PHY will check the secondary channels.

TABLE I

| Operating Channel Width | Conditions |
| --- | --- |
| 20 MHz, 40 MHz, 80 MHz, 160 MHz or 80 + 80 MHz | The start of a 20 MHz NON_HT PPDU in the primary 20 MHz channel as defined in 18.3.10.6 (CCA requirements) |

TABLE I-continued

| Operating Channel Width | Conditions |
| --- | --- |
| 40 MHz, 80 MHz, 160 MHz or 80 + 80 MHz | The start of a 40 MHz non-HT duplicate or VHT PPDU in the primary 40 MHz channel at or above −79 dBm, The start of an HT PPDU under the conditions defined in 20.3.21.5 (CCA sensitivity) |
| 80 MHz, 160 MHz or 80 + 80 MHz | The start of an 80 MHz non-HT duplicate or VHT PPDU in the primary 80 MHz channel at or above −76 dBm |
| 60 MHz or 80 + 80 MHz | The start of a 160 MHz or 80 + 80 MHz non-HT duplicate or VHT PPDU at or above −73 dBm |

SUMMARY

The embodiments provide a method implemented by a network device in a wireless local area network (WLAN) to provide a deferred clear channel assessment (CCA) from a physical layer to an upper layer within the network device. The deferred CCA enables the upper layer to make a final decision on the state of a wireless medium. The method identifies at least one condition on a wireless medium where an upper layer decision is required to determine a state of the wireless medium, and passes on requisite data to the upper layer to enable a decision on the state of the wireless medium. The embodiments encompass the definition of a conditional state that a PHY layer provides to an upper layer to identify cases and in some embodiments the PHY layer provides data that enables the upper layer, such as a media access control (MAC) layer to determine a state of a wireless medium where a CCA process at the PHY layer does not have sufficient information to complete the determination.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1A:
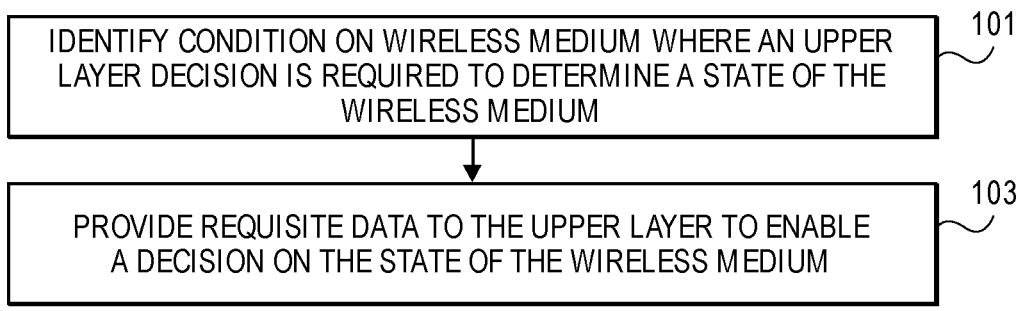
FIG. 1A is a flowchart of one embodiment of a process for identifying cases where CCA assessment is to be passed to an upper layer.

The embodiments provide a method and system for wireless medium assessment from a station in a wireless communication system, such as a wireless local area network (WLAN) implementing a IEEE 802.11 or similar wireless protocol. The method includes identifying conditions for a wireless medium where a decision about the state of the wireless medium is not to be made by the physical layer (PHY). Instead, any necessary data is provided to an upper layer logically above the PHY layer to enable the upper layer to make a decision on the state of the wireless medium. Passing this decision onto an upper layer can accommodate the more complicated conditions that are associated with more complex and aggressive clear channel assessment (CCA) procedures. Some of these procedures may take into account information that is in sections of a received frame that is not typically accessible to the PHY layer (i.e., media access control layer (MAC) layer sections/portions of a frame). The information relevant to the state of the wireless medium that is collected at the PHY layer can be passed up to the upper layer such that a CCA decision may be made. In some embodiments, the upper layer is a MAC layer. The PHY layer may identify scenarios where the decision is deferred to the upper layer such as scenarios where a received frame on a wireless medium falls between CCA thresholds and additional criteria such as a destination station or a transmitting station in the WLAN are used to determine whether the wireless medium is busy. This information is not available at the PHY layer and thus the decision can be deferred until the upper layer identifies this information. In some embodiments, a conditional state is introduced that represents this incomplete analysis. In an alternate embodiment, rather than explicitly relying exclusively on CCA thresholds, the decoding of the orthogonal frequency division multiplexing (OFDM) signal is utilized. Thus, rather than detecting a first threshold a determination is made whether the PHY layer can decode the OFDM signal. This indicates that the signal is above an equivalent of a first CCA threshold without directly measuring the signal strength or comparing it to the threshold. In this embodiment, a comparison of the second CCA threshold may still be utilized in the same fashion as described above and herein.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include stations and access points in wireless communications systems such as wireless local area network (WLAN). Stations are devices connected to and communicating in a WLAN including client or user devices that connect to the WLAN via access points. Access points are network devices that may be specialized wireless access points that can communicate with other network devices in the WLAN via the wireless medium or via wired connections.

With the increased demand on WLANs there is a need for more aggressive channel access, which requires modifications to the standard CCA process, such as increasing the CCA threshold value, to increase system throughput. However, increasing the CCA threshold value may result in more frequent packet collisions and degradation of Quality of Service (QoS) of packet delivery.

Current IEEE 802.11 based WLAN communication systems are being deployed in diverse environments. These environments are characterized by the existence of many access points (APs) and non-AP stations in geographically limited areas. Increased interference from neighboring network devices gives rise to performance degradation. Additionally, WLAN devices are increasingly required to support a variety of applications such as video, cloud access, and offloading. In particular video traffic is expected to be the dominant type of traffic in many high efficiency WLAN deployments. With the real-time requirements of some of these applications, WLAN users demand improved performance in delivering their applications, including improved throughput requiring improvements in the availability of the wireless medium.

In this regard, when a station (STA) is transmitting a packet over the wireless medium, nearby STAs are not allowed to transmit to prevent collisions from happening. The area that nearby STAs are prohibited from transmitting in is determined by the CCA sensitivity or CCA threshold value. In a dense WLAN environment, which is a target of WLAN development, current CCA threshold values (e.g., −82 dBm for 20 MHz) tends to be too conservative such that transmission efficiency is diminished or is sub-optimal. To enhance the WLAN system throughput and network efficiency, increasing the CCA threshold value is a possible solution. However, simply increasing the CCA threshold value (i.e., lowering CCA sensitivity) may cause other problems that may in some instances degrade network performance. The CCA threshold value is used herein as a value of CCA sensitivity representing a current signal quality level above which a signal must reach to render an associated wireless channel busy.

If the CCA threshold value is increased, transmission throughput could be increased, because each STA can be more aggressive in assessing the wireless medium, and thus the STA may transmit a frame more frequently. However, this aggressive transmission approach may occur even though there is a frame already occupying the wireless medium. This can result in an increased probability of packet collision, and can result in severe performance degradation under some circumstances or configurations such as for cell edge STAs.

The introduction of more aggressive CCA thresholds may be combined with the use of multiple or dynamic CCA thresholds, where a particular CCA threshold value is utilized under specifically defined circumstances. However, these circumstances may require the knowledge of networking information that is not readily available at a physical layer (PHY) where the CCA process is implemented. For example, if a decision on which CCA threshold value is to be applied relies on a target station or a transmitting station that is in proximity to the implementing station, then this analysis may require information known or determined at an upper layer above the PHY layer such as in a media access control (MAC) layer or similar layer of the IEEE 802.11 process. This introduces a problem for the CCA process to determine a status of the wireless medium. The embodiments described herein provide a mechanism for overcoming these problems and similar issues where the determination of a state of a wireless medium is to be determined with the involvement of a layer above the PHY layer of the IEEE 802.11 process.

The Open Systems Interconnect (OSI) model is a conceptual model that characterizes and standardizes the communication functions of a telecommunication system, which is a reference for understanding the context in which process, protocols and data structures are operating in such systems. A basic representation of the OSI model is illustrated below in Table II. As discussed above, the embodiments provide a process whereby layers above the PHY layer are involved in the CCA process. The PHY layer is the lowest layer of the OSI model and defines electrical and physical connections, including the relationships between the medium and physical devices. The data link layer controls connections between two devices and is composed of the MAC layer and logical link control (LLC) layer. In particular, the MAC layer controls how devices gain access to data and obtain permission to transmit data and the LLC layer identifies/encapsulates network layer protocols, performs error correction, and performs packet synchronization. As shown and described, the data link layer (and through association the MAC and LLC layers) operate above the PHY layer. While the embodiments may describe the involvement of the MAC (or 'data link') layer, one skilled in the art would understand that any combination of the higher layers could also be involved in conjunction with the PHY layer.

TABLE II

| OSI MODEL |
| --- |
| Application Layer (e.g., BGP, DHCP, and DNS) |
| Presentation Layer (e.g., data translation and formatting) |
| Session Layer (e.g., SCP, RPC or PAP) |
| Transport Layer (e.g., TCP, UDP, and RSVP) |
| Network Layer (e.g., IPv4, IPv6, ICMP or IGMP) |
| Data Link Layer (i.e., MAC Layer; OSPF, PPP or Ethernet) |
| Physical (PHY) Layer (e.g., OFDM) |

The embodiments provide a method and system of providing relevant channel assessment information from a PHY layer to an upper layer within a network device in a wireless communication system. Generally, the embodiments provide a method that determines a received signal quality (i.e., a power level, signal to noise ratio or similar metric of the received signal characteristics) of a given wireless medium or a particular wireless channel within the wireless medium. The characteristics of the wireless medium, such as the signal quality metric, can be analyzed to determine whether a state of the wireless medium can be definitively determined. Any set of conditions related to signal quality or similar information available at the PHY layer can be processed to determine a state of the wireless medium. However, if the set of conditions do not allow for a definitive determination of the state of the wireless medium, then an indication or information related to the received signal can be provided to an upper layer to enable the upper layer to determine a state of the wireless medium. In some embodiments, a conditional state is reported to the upper layer. For example, in scenarios where there are multiple CCA thresholds the conditional state can be reported to the upper layer indicating to the upper layer that a wireless medium (or a channel thereof) is conditionally idle when the received signal quality is between a first CCA threshold value and a second CCA threshold value.

More specifically, IEEE 802.11 based WLAN systems implement CCA in the physical layer (PHY) to determine the current state of use of the wireless medium (WM), such that a station will access the channel only when the WM becomes idle. When the PHY layer identifies a change in the status of the WM, the PHY indicates this information to the upper layer, e.g., informs the MAC layer using a PHY-CCA.indication primitive. The PHY-CCA.indication primitive is an indication by the PHY layer to the local MAC entity of the current state of the wireless medium and provides observed Idle Power Indicator (IPI) values when IPI reporting is turned on. The parameters of the PHY-CCA.indication primitive comprises STATE, IPI-REPORT, and channel-list. The STATE parameter can be one of two values: BUSY or IDLE. The parameter value is BUSY if the assessment of the channel(s) by the PHY layer determines that the channel(s) are not available. Otherwise, the value of the parameter is IDLE.

In one example embodiment, the IPI-REPORT parameter is present if dot11RadioMeasurementActivated is true and if IPI reporting has been turned on by the IPI-STATE parameter. The IPI-REPORT parameter provides a set of IPI values for a time interval. The set of IPI values may be used by the MAC layer for radio measurement purposes. The set of IPI values are recent values observed by the PHY entity since the generation of the most recent PHY-TXEND.confirm, PHY-RXEND.indication, PHY-CCARESET.confirm, or xPHY-CCA.indication primitive, whichever occurred latest.

When the STATE of the PHY-CCA.indication is IDLE or when, for the type of PHY layer in operation, the CCA is determined for a single channel, the channel-list parameter may be absent. Otherwise, the channel-list carries a set of values indicating which channels are busy. The channel-list parameter in a PHY-CCA.indication primitive generated by a very high throughput (VHT) station contains at most a single element. In Table III below the channel-list parameter elements(11ac) of the IEEE 802.11Revmc D3.3 standard defines the members of this set.

TABLE III

| channel-list element | Meaning |
| --- | --- |
| primary | For an HT STA that is not a VHT STA, indicates that the primary 20 MHz channel is busy.<br>For a VHT STA, indicates that the primary 20 MHz channel is busy according to the rules specified in 22.3.18.5.3 (CCA sensitivity for signals occupying the primary 20 MHz channel).<br>For a TVHT STA, indicates that the primary channel is busy according to the rules specified in 23.3.18.6.3 (CCA sensitivity for signals occupying the primary channel).(11af) |
| secondary | For an HT STA that is not a VHT STA, indicates that the secondary channel is busy.<br>For a VHT STA, indicates that the secondary 20 MHz channel is busy according to the rules specified in 22.3.18.5.4 (CCA sensitivity for signals not occupying the primary 20 MHz channel).<br>For a TVHT STA, indicates that the secondary channel is busy according to the rules specified in 23.3.18.6.4 (CCA sensitivity for signals not occupying the primary channel).(11af) |
| secondary40 | Indicates that the secondary 40 MHz channel is busy according to the rules specified in 22.3.18.5.4 (CCA sensitivity for signals not occupying the primary 20 MHz channel).<br>For a TVHT STA, indicates that the secondary TVHT_2W channel is busy according to the rules specified in 23.3.18.6.4 (CCA sensitivity for signals not occupying the primary channel).(11af) |
| secondary80 | Indicates that the secondary 80 MHz channel is busy according to the rules specified in 22.3.18.5.4 (CCA sensitivity for signals not occupying the primary 20 MHz channel). |

A PHY-CCA.indication is generated when the status of any of the set of channels of a wireless medium change from an IDLE status to BUSY status, from BUSY to IDLE or when the elements of the channel-list parameter change. The PHY-CCA.indication can be generated when this status information changes, including during the period of time when the PHY layer is receiving data. The timing of generating PHY.CCA.indication primitives related to transitions on secondary channels can be PHY layer specific.

However, this basic PHY-CCA.indication primitive as described above has some limitations when it is to be used in connection with next generation WLAN systems, e.g., IEEE 802.11ax. These limitations are related to the problems of using more complicated and aggressive CCA processes. In some wireless standards (e.g., IEEE 802.11REVmc_D3.3), CCA is decided by the PHY layer and its result is indicated to the MAC layer using the PHY-CCA.indication primitive. However, if a more sophisticated CCA mechanism is used in a WLAN system, such as IEEE 802.11ax, it may not be possible to assess the channel status without involvement of the MAC layer.

Examples of cases where involvement of the MAC layer is needed include where a station supports transmit power control (TPC). In this case the station may assess the channel as idle or busy depending on transmission power or bandwidth, which is set by the MAC layer. In another example, if a station needs to identify the target receiver of a packet that occupies the wireless medium and compare this information with a neighboring station list that a MAC layer manages, then the station may assess the channel idle or busy depending on the outcome of the comparison in the MAC layer. In a further example, if a channel assessment and a transmission priority of a station is coupled together such that depending on the received signal quality, the station may have a different transmission priority and transmission power, the decision on the wireless medium cannot be made at the PHY layer but needs to go up to the MAC layer.

When a station identifies the start of an orthogonal frequency division multiple access (OFDMA) packet, it may declare wireless medium to be busy. However, if the STA still needs to check the information on the PHY layer preamble part (e.g., BSS information of the transmitter), the STA's channel assessment at the start of the packet is not a final decision, and thus the MAC layer may need to act differently depending on PHY layer information, which is not delivered to the MAC layer in current PHY-CCA.indication primitive. As current PHY-CCA.indication provides only STATE, IPI-REPORT, and channel-list information to MAC layer, this mechanism cannot support MAC-aided channel assessment process that is described above.

The embodiments described herein augment the use of the PHY-CCA.indication primitive and the logic for generating the PHY-CCA.indication primitive. The embodiments provide a method for indicating channel assessment information from the PHY layer to the MAC layer. More specifically, in one embodiment a method that enables the MAC layer to assess the wireless medium status correctly based on the information the PHY layer provides to the MAC layer is described. In some embodiments, instead of the PHY layer deciding channel status entirely on its own and indicating a channel assessment result to an upper layer, e.g., a MAC layer, the embodiments define a Physical layer-Service Access Point (PHY-SAP) primitive that the PHY layer utilizes to forward channel status information without a final decision on channel assessment. In other embodiments, the PHY layer indicates channel assessment result as 'conditionally idle,' which implies that channel will be idle if some conditions that the MAC layer is involved with evaluating are met. Therefore, the PHY layer provides information to the MAC layer to enable the MAC layer to decide how to determine a status of the wireless medium and adjust its own transmission. There are multiple different embodiments available based on the concept and examples provided herein. The scope of the methods and systems are not limited to the embodiments and examples provided herein. Rather, one skilled in the art would understand that other embodiments are enabled that are consistent with the principles and structures described herein. The embodiments and examples are provided by way of illustration and not limitation.

FIG. 1A is a flowchart of one embodiment of a process for identifying cases where CCA assessment is to be passed to an upper layer. The illustrated embodiment describes the process as applicable to any implementation or context, whereas further embodiments and implementations are described further herein below by way of example. The process identifies conditions on a wireless medium where an upper layer decision is required to determine the state of the wireless medium (Block 101). The PHY layer is unable to determine a state of the wireless medium due to modifications to the CCA process being implemented by a network device that relies on data available at a level above the PHY layer. For example, in implementations where the state of the wireless medium is determined based on whether a target network device is in a neighbor list maintained at the MAC layer, the PHY layer determines that the decision is to be made at the upper layer and defers to the upper layer where a set of defined conditions are detected such as the signal quality falling between a set of CCA thresholds. While the examples primarily discuss the determination of the state of a wireless medium, one skilled in the art would understand that the process can be applied for specific wireless channels or for any subset of the wireless channels in the wireless medium.

Where the conditions for deferring to the upper layer are detected, then the PHY layer provides the requisite data to the upper layer to enable the decision on the state of the wireless medium to be completed (Block 103). The requisite data can be any information such as information passed in the PHY-CCA.indication. The requisite data can be an indicator such as a conditional state indicator or specific PHY layer data can be provided dependent on the decision making process and the upper layer to complete the decision making process on the state of the wireless medium.

Figure 1B:
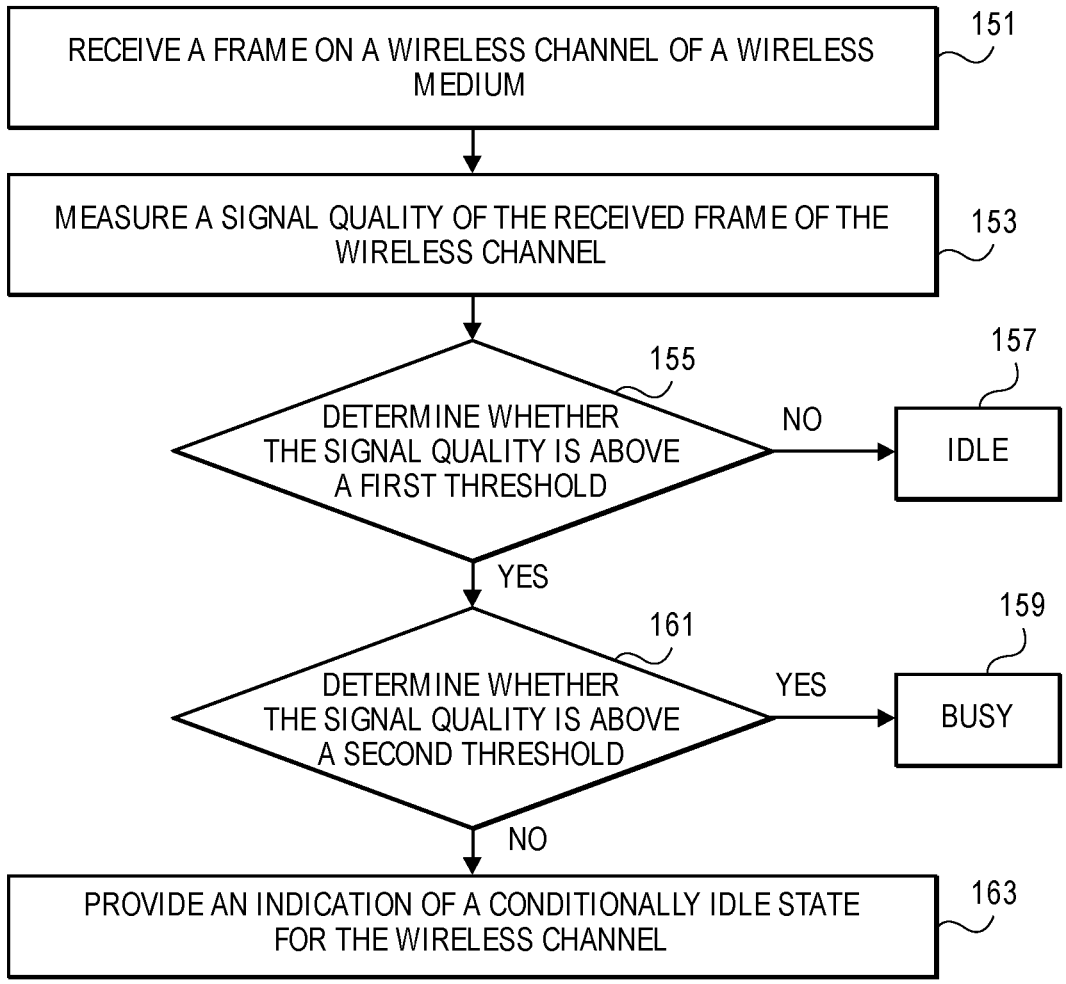
FIG. 1B is a flowchart of another embodiment of a process for identifying cases where CCA assessment where a conditionally idle state is identified and passed to an upper layer.

FIG. 1B is a flowchart of another embodiment of a process for identifying cases involving CCA assessment where a conditionally idle state is identified and passed to an upper layer. This embodiment is provided by way of example to illustrate a case where the PHY layer identifies a scenario where an upper layer will make a determination of the status of the wireless medium. This scenario demonstrates a case where the PHY layer identifies scenarios where a signal quality of a received frame falls between two CCA thresholds, where the applicable threshold is dependent on information determined at an upper layer such as a check related to a source or target network device. In this embodiment, the process is initiated in response to receiving a frame on a wireless channel of a wireless medium (Block 151). The signal quality of the frame is then determined (Block 153). A check is then made in this example to determine whether the signal quality falls between two thresholds.

Figure 2A:
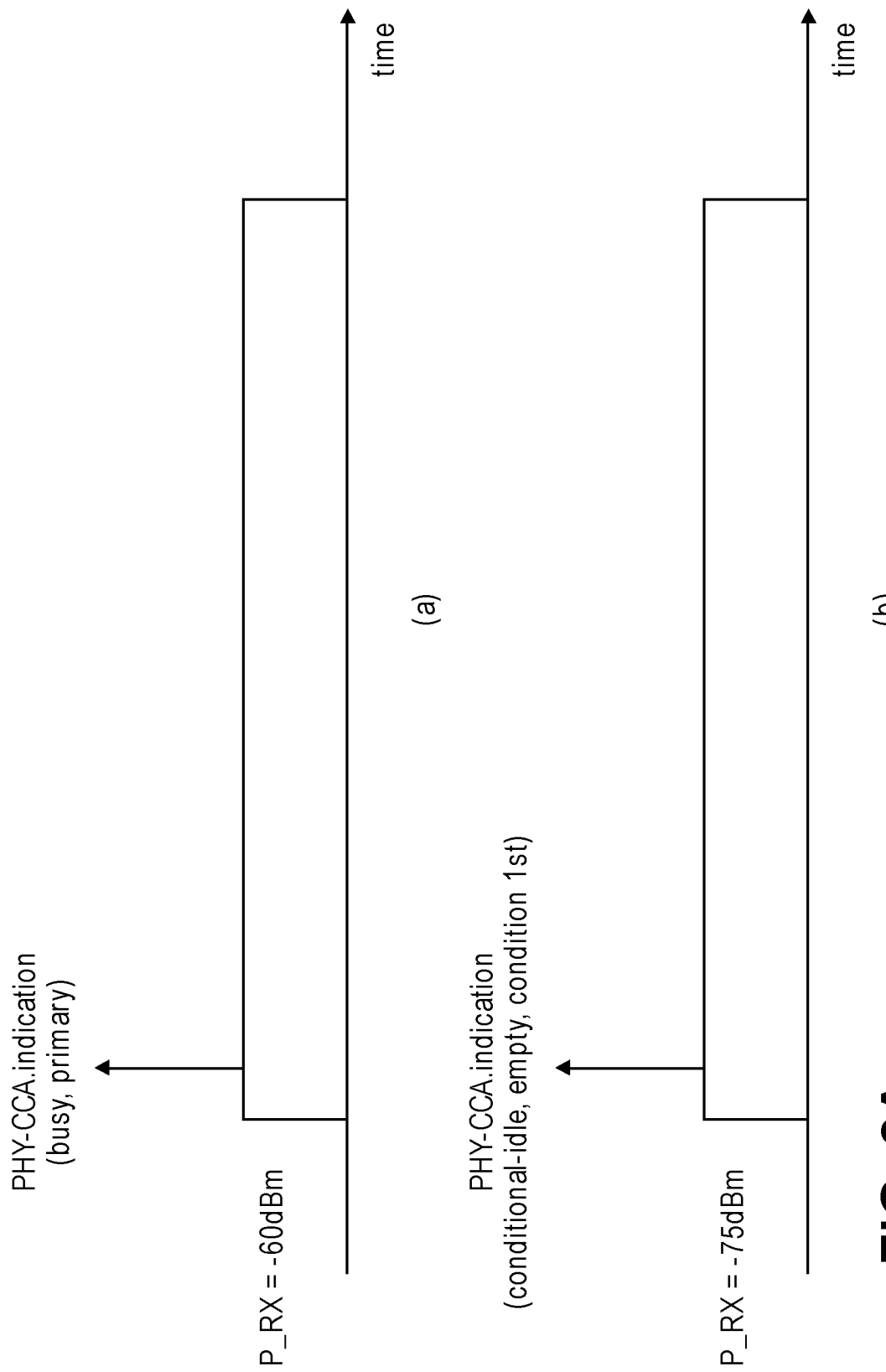
FIG. 2A is a timing diagram of a wireless medium providing example cases where a conditionally idle state is recognized and passed via a PHY-CCA.indication.

This aspect of the process can be described in relation to FIG. 2A. FIG. 2A is a timing diagram of a wireless medium providing example cases where a decision about the state of the wireless medium is deferred to an upper layer. As shown in FIG. 1A, the process checks whether the first CCA is exceeded by the signal quality of the received frame (Block 155). In other embodiments, a decoding of the OFDM signal is used in place of the direct comparison of the signal quality of the received frame. Decoding the OFDM signal indicates that the signal strength would exceed the first CCA threshold. For sake of clarity, the example of direct first CCA threshold comparison is used herein, however, one skilled in the art would understand that the OFDM decoding could be used in its place. Where the first CCA threshold is not exceeded, then the process determines at the PHY layer that the wireless channel is idle (Block 157). Where the received frame is above the first CCA threshold a check is made whether the signal quality is above a second CCA threshold (Block 161). Where the signal quality is above the second threshold, then the wireless medium is determined to be busy by the PHY layer. However, where the signal quality is between the first CCA threshold and the second CCA threshold, then the process defers the decision on the state of the wireless medium and provides an indication of a conditionally idle state or similar indication for the wireless channel (Block 163).

Returning to the example of FIG. 2A, the first CCA threshold level is set at −82 dBm and the second CCA threshold level is set at −62 dBm. And, a network device identifies a start of an OFDM symbol on the primary channel. In the first part, (a), of the FIG. 2A, the received signal power is −60 dBm, which is greater than the second CCA threshold. Therefore, the PHY layer identifies the wireless medium as busy and, for example sends the PHY-CCA.indication primitive to MAC layer with the parameter STATE set as busy and the parameter channel-list set as primary. However, in the second part, (b), of the FIG. 2A, the received signal power is −75 dBm, which is in between the first CCA threshold and the second CCA thresholds. In this case, where the received signal power falls in a given range (i.e., between the first CCA threshold and the second CCA threshold), the decision on the status of the wireless medium depends on the transmission power of the network device. The PHY layer identifies the wireless medium as conditional-idle. In one embodiment, the PHY layer sends a PHY-CCA.indication primitive to the MAC layer with the parameter STATE set as conditional-idle. In a further embodiment, the PHY-CCA.indication.primitive includes additional parameters, such as a parameter channel-list (which may be empty), a parameter condition-list that may include RSSI (e.g., indicating RSSI=−75 dBm for the primary 20 MHz channel) and similar information.

Figure 2B:
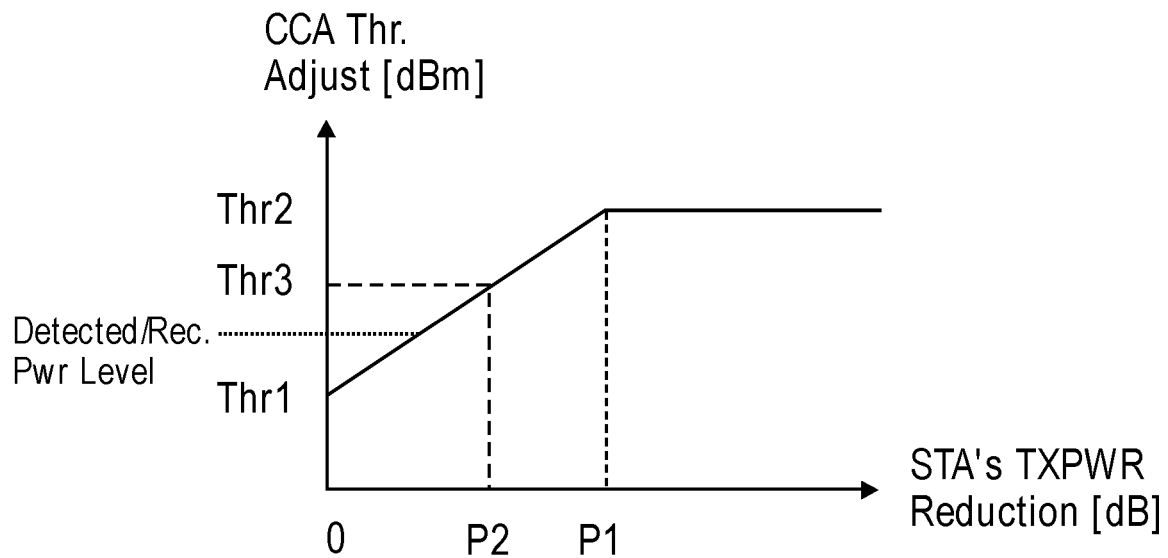
FIG. 2B is a diagram that illustrates one example embodiment regarding the condition on the transmit power of the network device.

FIG. 2B is a diagram that illustrates one example embodiment regarding the condition on the transmit power of the network device relative to an adjusted CCA threshold value. As shown in FIG. 2B, the adjusted CCA threshold for assessing a channel to be busy is variable depending on the amount of power reduction from the station's maximum transmission power level. If the station does not reduce its transmission power (station's TXPWR Reduction=0 dB), the adjusted CCA threshold is set to the first CCA threshold level (−82 dBm). However, if the station reduces its transmission power, the amount of increase in the adjusted CCA threshold level from the first CCA threshold level is proportional to the level of decrease in the station's transmission power until the adjusted CCA threshold level reaches the second CCA threshold level (−62 dBm) (i.e., at power reduction level P1). If the adjusted CCA threshold level reaches the second CCA threshold level, the adjusted CCA threshold level is not increased further even if the station decreases its transmission power more.

As shown in the example in FIG. 2B, the detected/received signal level, which is passed from the PHY layer to an upper layer (e.g., the MAC layer) is between the first CCA threshold level and the second CCA threshold level. This initially caused the PHY layer to report that the medium/channel is conditionally idle. This state/status of the medium/channel is passed, along with the detected/received power level of the channel/medium, to the upper layer through the PHY-CCA.indication.primitive or another data structure. The MAC layer determines the TXPWR reduction based on various factors, including changes in RSSI values over time or similar metrics. As shown in the example in FIG. 2B, the TXPWR reduction level is at P2. Based on the proportional relationship between the TXPWR reduction level, the adjusted CCA threshold is set to Thr3. Since the detected/received power level of the channel/medium is below the adjusted CCA threshold (i.e., below Thr3), the channel/medium is determined by the upper layer to be IDLE.

Figure 2C:
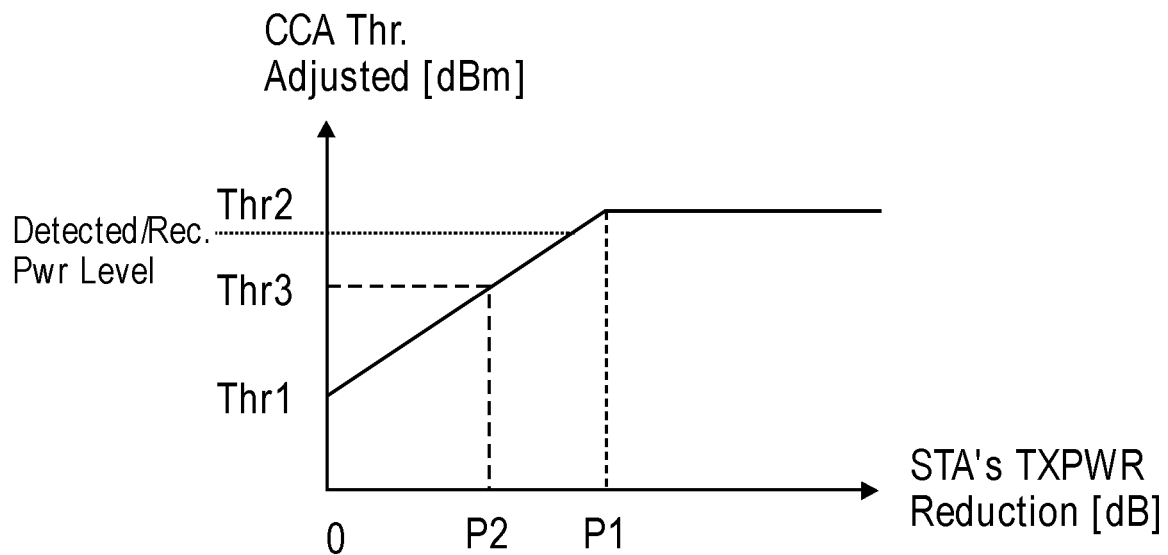
FIG. 2C is a diagram that illustrates a further example embodiment regarding the condition on the transmit power of the network device.

In contrast, in a different example shown in FIG. 2C, the TXPWR reduction level is still at P2, which causes the adjusted CCA threshold to be proportionally set at Thr3 as described above. However, the detected/received power level is now above the adjusted CCA threshold (i.e., above Thr3). Accordingly, the upper layer determines that the channel/medium is determined to be BUSY.

Table IV illustrates another example embodiment regarding the condition of the transmission power of the network device. As shown in Table IV, the adjusted CCA threshold for assessing the channel busy or idle is adjusted depending on the transmission bandwidth of the station's pending frame transmission. If the station's transmission bandwidth of the pending frame is 20 MHz, the adjusted CCA threshold is the same as the first CCA threshold level (−82 dBm). However, if the station's transmission bandwidth of the station's pending frame is higher than 20 MHz, the station's CCA threshold level is adjusted such that a higher CCA threshold level is applied if the transmission bandwidth is increased. As shown in Table IV, the adjusted CCA threshold level is increased by 3 dB if the transmission bandwidth is doubled.

TABLE IV

| Transmission Bandwidth | Adjusted CCA Threshold [dBm] |
|---|---|
| 20 MHz | Thr1 |
| 40 MHz | Thr1 + 3 |
| 80 MHz | Thr1 + 6 |
| 160 MHz or 80 MHz + 80 MHz | Thr1 + 9 |

Returning to the example of FIG. 2A, the PHY-CCA.indication primitive is modified to further indicate a state that the status of a wireless medium can be determined by the MAC layer. For this purpose, a state which indicates that channel is idle under some condition is added. If the state parameter in the PHY-CCA.indication indicates that channel is idle under some condition, the PHY-CCA.indication primitive carries information that is needed for the MAC layer to determine the condition of the wireless medium. Based on this principle, the STATE parameter in this example can be one of following values: BUSY, IDLE, and CONDITIONAL-IDLE. The parameter value is BUSY if the assessment of the channel(s) by the PHY layer determines that the channel(s) are not available. The parameter value is CONDITIONAL-IDLE if the assessment of the channel(s) by the PHY layer determines that channel(s) are available under some conditions. Otherwise, the value of the parameter is IDLE. Also, the PHY-CCA.indication primitive may comprise another parameter, e.g., condition-list, wherein when STATE is BUSY or IDLE, the condition-list parameter is absent. Otherwise, the condition-list parameter carries information that is needed for the MAC layer to determine to meet the condition. Examples of the information that is provided to an upper layer such as the example MAC layer, may comprise received signal strength, received signal strength for each wireless channel, channel status information of the received frame that occupies the wireless medium, information on a target receiver of the frame that occupies the wireless medium, information on a transmitter of the frame that occupies the wireless medium, information on a duration of the frame that occupies the wireless medium, an RXVECTOR, or similar information. In some embodiments, the parameter related with the condition may be carried using other PHY primitive, such as PHY-RX-START.indication. In some embodiments, this information can be provided to the upper layer in combination with any state of the wireless medium such as where the wireless medium is determined to be either idle or busy by the PHY layer.

Figure 3:
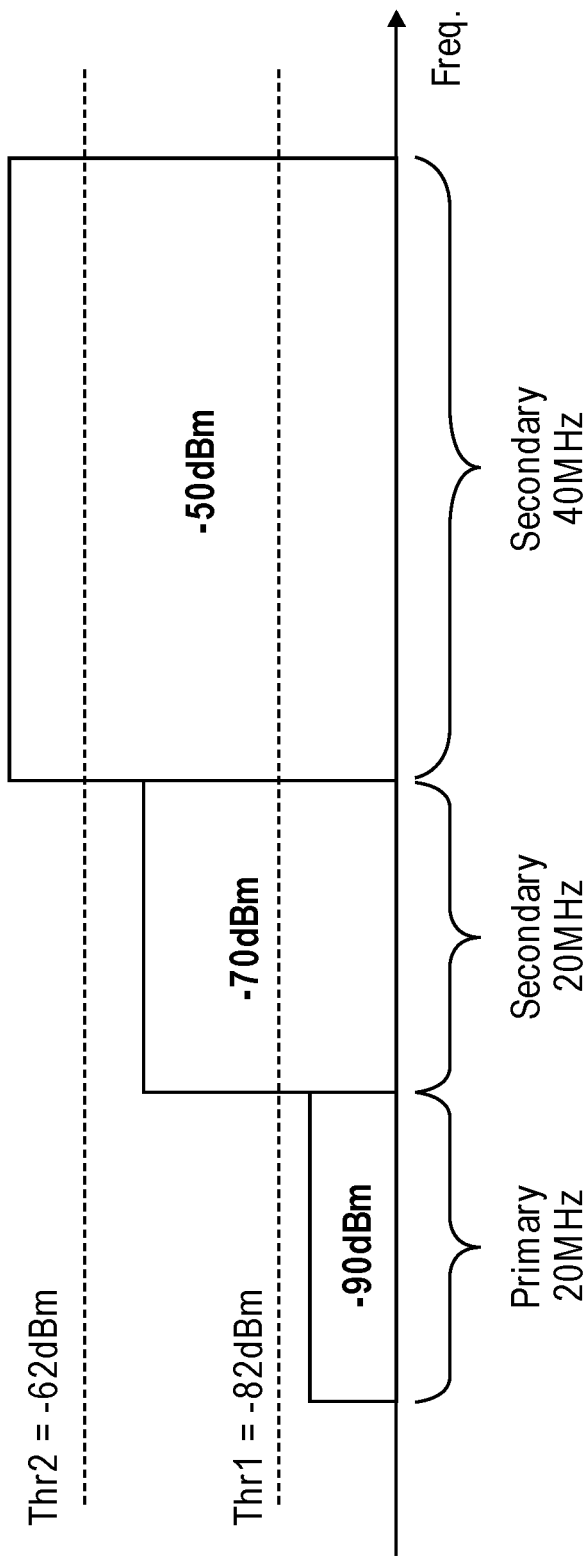
FIG. 3 is a diagram showing a further example of multi-channel assessment.

FIG. 3 is a diagram that illustrates another example embodiment for multi-channel assessment. In the illustrated example a secondary wireless channel is assessed. In this example, the same CCA policy is described herein above with regard to FIGS. 1B and 2. However, in this example, a network device is capable of receiving a wide bandwidth signal (80 MHz). And, at the time of assessing the wireless medium, the received power of the primary 20 MHz channel is −90 dBm and the secondary 20 MHz channel is −70 dBm, and the secondary 40 MHz channel is −50 dBm. Because the received power of the primary channel is below the first CCA threshold (−82 dBm), the network device will also check the secondary channels, and will find out that the secondary 20 MHz channel is in between the first and the second CCA threshold value, while the secondary 40 MHz channel is above the second CCA threshold value (−62 dBm). As the network device is allowed to transmit in both the primary and the secondary 20 MHz channels, even though transmission condition is different (no condition for the primary 20 MHz but there is a condition for the secondary 20 MHz channel), because the network device may need to use the same transmission power for both the primary channel and the secondary 20 MHz channel, the PHY layer indicates the channel assessment state as conditional-idle. The details of the received signal strength indicator (RSSI) value for both the primary channel and the secondary 20 MHz channel is indicated using the PHY-CCA.indication primitive. Therefore, the PHY-CCA.indication primitive may have the parameter STATE set as conditional-idle, the parameter channel-list set as secondary, and the parameter condition-list indicating "RSSI(primary) =−90 dBm and RSSI(secondary 20)=−70 dBm."

In another example embodiment, a method of indicating channel assessment from a PHY layer to upper layer within a device in a wireless communication system is provided. In this embodiment, the method measures a received power of the wireless channel. The process indicates to the upper layer that the channel is busy, if the received power is above a first CCA threshold value. The process indicates to the upper layer that the channel is idle, if the received power is below a second threshold value, where the second threshold value is smaller than the first CCA threshold value. The process indicates to the upper layer that the wireless channel is conditionally idle, if the received power is between the first threshold value and the second threshold value.

Figure 4:
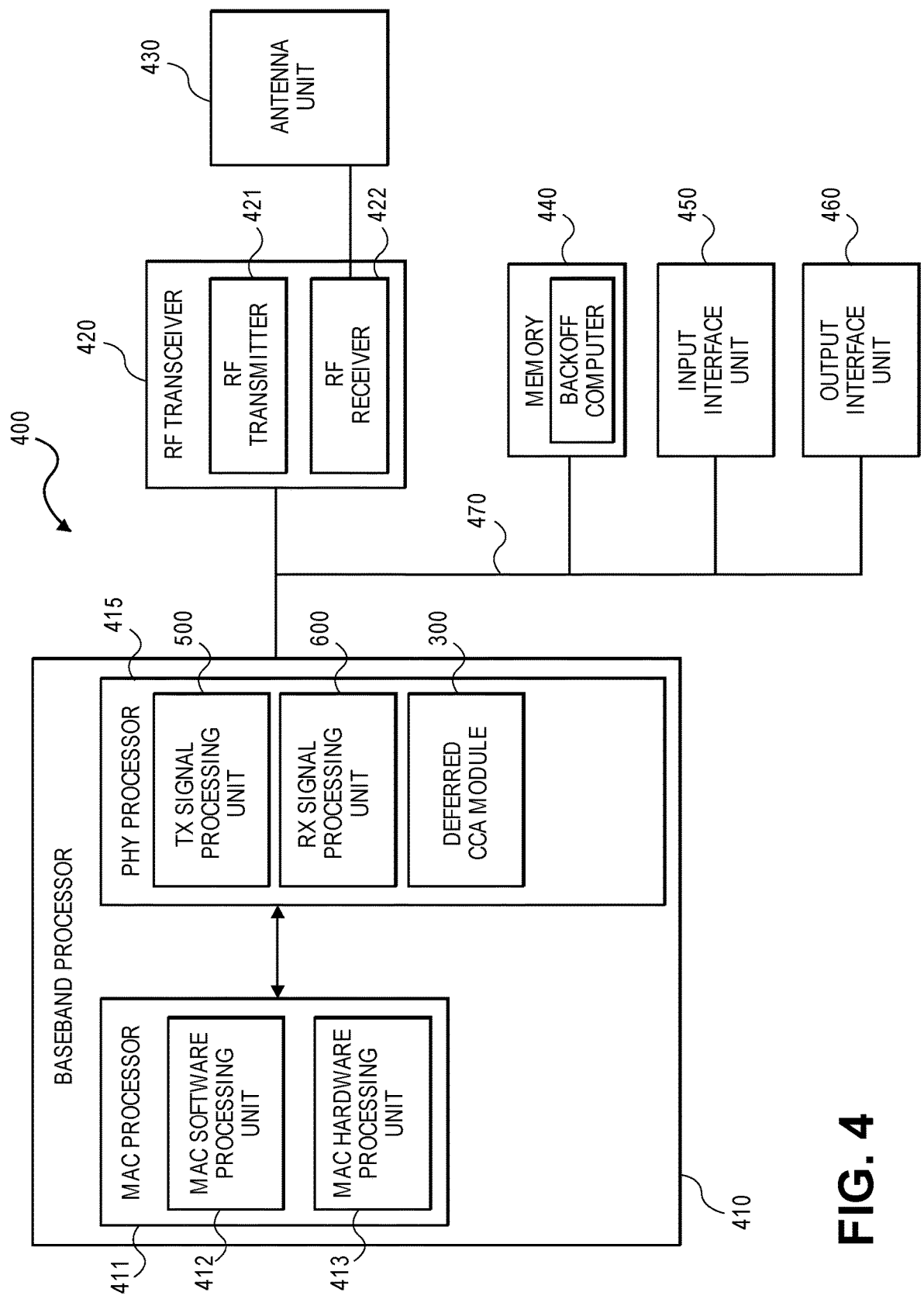
FIG. 4 is a diagram of a network device implementing a station or access point that executes an enhanced CCA process.
Figure 7:
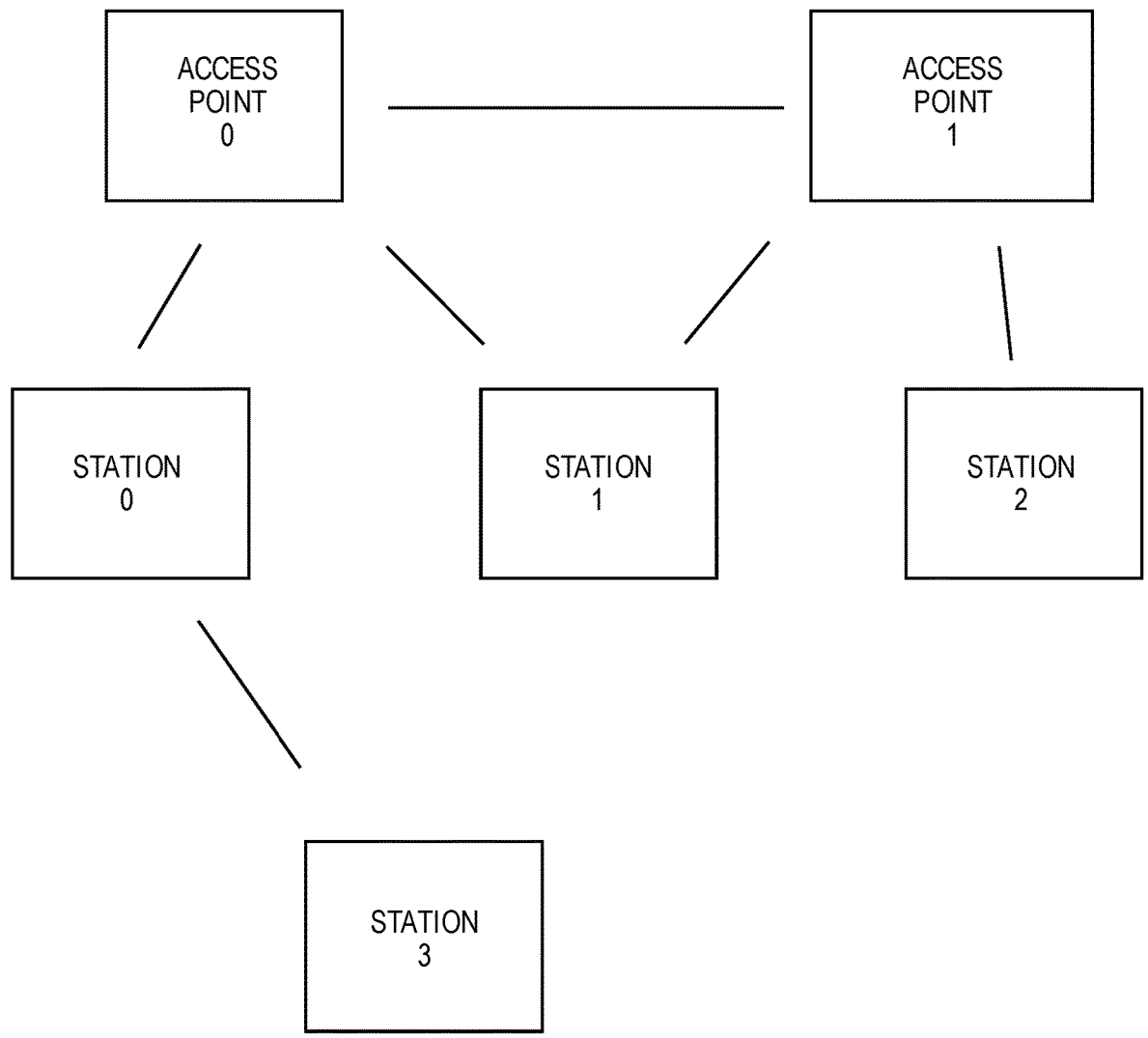
FIG. 7 is a diagram of an example wireless local area network.

FIG. 4 is a diagram of a network device implementing a station or access point that executes a CCA process that detects deferred state determination scenarios. In a wireless local area network (WLAN) such as the example WLAN illustrated in FIG. 7. Each of the WLAN devices may include a medium access control (MAC) layer and a physical (PHY) layer according to IEEE (Institute of Electrical and Electronics Engineers) 802.11 standard. In the plurality of WLAN devices, at least one WLAN device may be an access point (AP) station (e.g., access point 0 and access point 1 in FIG. 7) and the other WLAN devices may be non-AP stations (non-AP STAs), (e.g., stations 0-3 in FIG. 7). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 7, a WLAN can have any combination of stations and access points that can form a discrete network, an ad hoc network or any combination thereof. Any number of APs and stations can be included in a WLAN and any topology and configuration of such APs and stations in the network can be utilized.

Referring to FIG. 4, the example WLAN device 400 includes a baseband processor 410, a radio frequency (RF) transceiver 420, an antenna unit 430, memory 440, an input interface unit 450, an output interface unit 460, and a bus 470. The baseband processor 410 performs baseband signal processing, and includes a MAC processor 411 and a PHY processor 415. These processors can be any type of integrated circuit (IC) including a general processing unit or an application specific integrated circuit (ASIC).

In one embodiment, the MAC processor 411 may include a MAC software processing unit 412 and a MAC hardware processing unit 413. The memory 440 may store software (hereinafter referred to as "MAC software"), including at least some functions of the MAC layer. The MAC software processing unit 412 executes the MAC software to implement some functions of the MAC layer and the MAC hardware processing unit 413 may implement the remaining functions of the MAC layer in hardware (hereinafter referred to as "MAC hardware"). However, the MAC processor 411 is not limited to this distribution of functionality.

The PHY processor 415 includes a transmitting signal processing unit 500 and a receiving signal processing unit 600 described further herein below with reference to FIGS. 5 and 6. In some embodiments, the PHY processor 415 can also implement the deferred CCA module 300. The deferred CCA module 300 and the station set management module 400 can implement the respective functions for any combination of the embodiments described herein above with regard to FIGS. 1-3. In other embodiments, these modules may be implemented by or distributed over both the PHY processor 415 and the MAC processor 411. These modules may be implemented as software or as hardware components of either the PHY processor 415 or MAC processor 411. These modules can be implemented as components of the transmitting signal processing unit 500 and the receiving signal processing unit 600 or as discrete components. In a further embodiment, the deferred CCA module 300 can be implemented by separate components or processors within the baseband processor 410.

The baseband processor 410, the memory 440, the input interface unit 450, and the output interface unit 460 may communicate with each other via the bus 470. The radio frequency (RF) transceiver 420 includes an RF transmitter 421 and an RF receiver 422. The memory 440 may further store an operating system and applications. In some embodiments, the memory may store the nearby stations set. The input interface unit 450 receives information from a user and the output interface unit 460 outputs information to the user.

The antenna unit 430 includes one or more antennas. When a multiple-input multiple-output (MIMO) or a multi-user MIMO (MU-MIMO) system is used, the antenna unit 430 may include a plurality of antennas.

Figure 5:
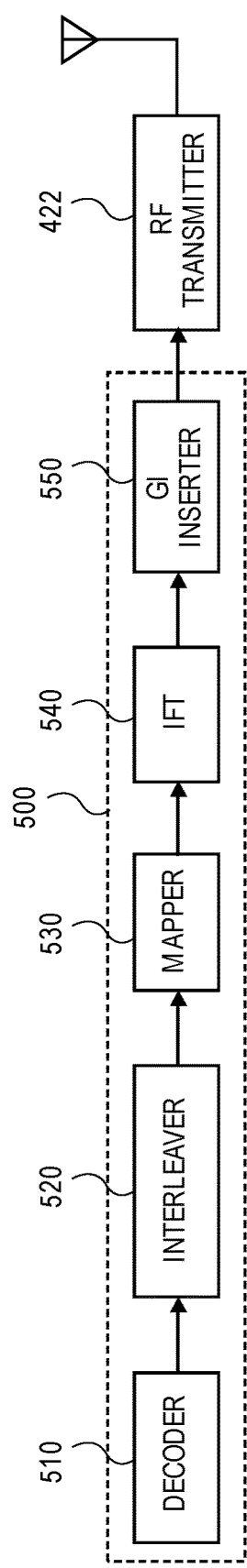
FIG. 5 is a schematic block diagram exemplifying a transmitting signal processor in a WLAN device.

FIG. 5 is a schematic block diagram exemplifying a transmitting signal processor in a WLAN device. Referring to the above drawing, a transmitting signal processing unit 500 includes an encoder 510, an interleaver 520, a mapper 530, an inverse Fourier transformer (IFT) 540, and a guard interval (GI) inserter 550. The encoder 510 encodes input data. For example, the encoder 510 may be a forward error correction (FEC) encoder. The FEC encoder may include a binary convolutional code (BCC) encoder followed by a puncturing device or may include a low-density parity-check (LDPC) encoder.

The transmitting signal processing unit 500 may further include a scrambler for scrambling the input data before encoding to reduce the probability of long sequences of 0s or 1s. If BCC encoding is used in the encoder 510, the transmitting signal processing unit 500 may further include an encoder parser for demultiplexing the scrambled bits among a plurality of BCC encoders. If LDPC encoding is used in the encoder 510, the transmitting signal processing unit 500 may not use the encoder parser.

The interleaver 520 interleaves the bits of each stream output from the encoder to change the order of bits. Interleaving may be applied only when BCC encoding is used. The mapper 530 maps the sequence of bits output from the interleaver to constellation points. If LDPC encoding is used in the encoder 510, the mapper 530 may further perform LDPC tone mapping in addition to constellation mapping.

When multiple input—multiple output (MIMO) or multiple user (MU)-MIMO is used, the transmitting signal processing unit 500 may use a plurality of interleavers 520 and a plurality of mappers 530 corresponding to the number $N_{SS}$ of spatial streams. In this case, the transmitting signal processing unit 500 may further include a stream parser for dividing outputs of the BCC encoders or the LDPC encoder into blocks that are sent to different interleavers 520 or mappers 530. The transmitting signal processing unit 500 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 540 converts a block of the constellation points output from the mapper 530 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 540 may be provided for each transmit chain.

When MIMO or MU-MIMO is used, the transmitting signal processing unit 500 may insert cyclic shift diversities (CSDs) to prevent unintentional beamforming. The CSD insertion may occur before or after the inverse Fourier transform 540. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 550 prepends a GI to the symbol. The transmitting signal processing unit 500 may optionally perform windowing to smooth edges of each symbol after inserting the GI. The RF transmitter 421 converts the symbols into an RF signal and transmits the RF signal via the antenna unit 430. When MIMO or MU-MIMO is used, the GI inserter 550 and the RF transmitter 421 may be provided for each transmit chain.

Figure 6:
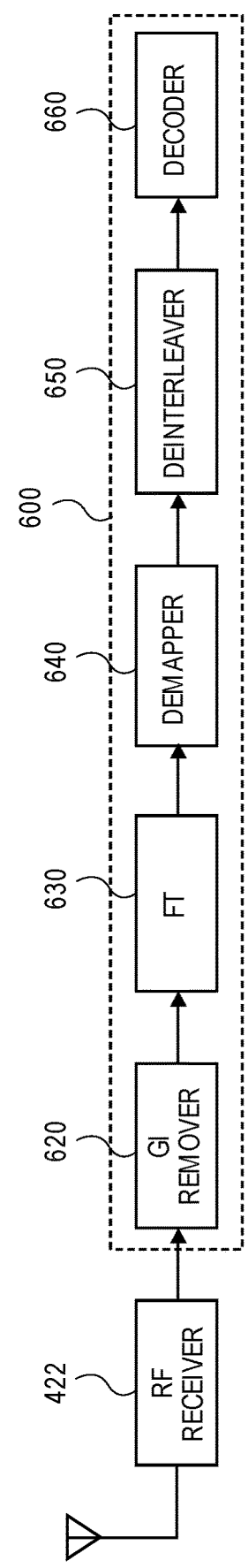
FIG. 6 is a schematic block diagram exemplifying a receiving signal processing unit in the WLAN.

FIG. 6 a schematic block diagram exemplifying a receiving signal processing unit in the WLAN. Referring to FIG. 6, a receiving signal processing unit 600 includes a GI remover 620, a Fourier transformer (FT) 630, a demapper 640, a deinterleaver 650, and a decoder 660.

An RF receiver 422 receives an RF signal via the antenna unit 430 and converts the RF signal into symbols. The GI remover 620 removes the GI from the symbol. When MIMO or MU-MIMO is used, the RF receiver 422 and the GI remover 620 may be provided for each receive chain.

The FT 630 converts the symbol (i.e., the time domain block) into a block of constellation points by using a discrete Fourier transform (DFT) or a fast Fourier transform (FFT). The Fourier transformer 630 may be provided for each receive chain.

When MIMO or MU-MIMO is used, the receiving signal processing unit 600 may use a spatial demapper for converting the Fourier transformed receiver chains to constellation points of the space-time streams and an STBC decoder for despreading the constellation points from the space-time streams into the spatial streams.

The demapper 640 demaps the constellation points output from the Fourier transformer 630 or the STBC decoder to bit streams. If LDPC encoding is used, the demapper 640 may further perform LDPC tone demapping before constellation demapping. The deinterleaver 650 deinterleaves the bits of each stream output from the demapper 640. Deinterleaving may be applied only when BCC encoding is used.

When MIMO or MU-MIMO is used, the receiving signal processing unit 600 may use a plurality of demappers 640 and a plurality of deinterleavers 650 corresponding to the number of spatial streams. In this case, the receiving signal processing unit 600 may further include a stream deparser for combining the streams output from the deinterleavers 650.

The decoder 660 decodes the streams output from the deinterleaver 650 or the stream deparser. For example, the decoder 660 may be an FEC decoder. The FEC decoder may include a BCC decoder or an LDPC decoder. The receiving signal processing unit 600 may further include a descrambler for descrambling the decoded data. If BCC decoding is used in the decoder 660, the receiving signal processing unit 600 may further include an encoder deparser for multiplexing the data decoded by a plurality of BCC decoders. If LDPC decoding is used in the decoder 660, the receiving signal processing unit 500 may not use the encoder deparser.

A frame as used herein may refer to a data frame, a control frame, or a management frame may be exchanged between WLAN devices. The data frame is used for transmission of data forwarded to a higher layer. The WLAN device transmits the data frame when the wireless medium is considered to be in an idle condition or state such as after performing backoff if a DIFS has elapsed from a time when the medium was not busy or under similar conditions. The management frame is used for exchanging management information, which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for an associated access category (AC), i.e., AIFS[AC] has elapsed. In this case, the data frame, the management frame, or the control frame, which is not the response frame, may use the AIFS[AC].

As discussed herein an enhanced CCA module is implemented to manage the transmission of frames by the WLAN device. CCA may implement a CSMA (carrier sense multiple access)/CA (collision avoidance) based frame transmission procedure or similar procedure for avoiding collisions between frames in a channel.

Figure 8:
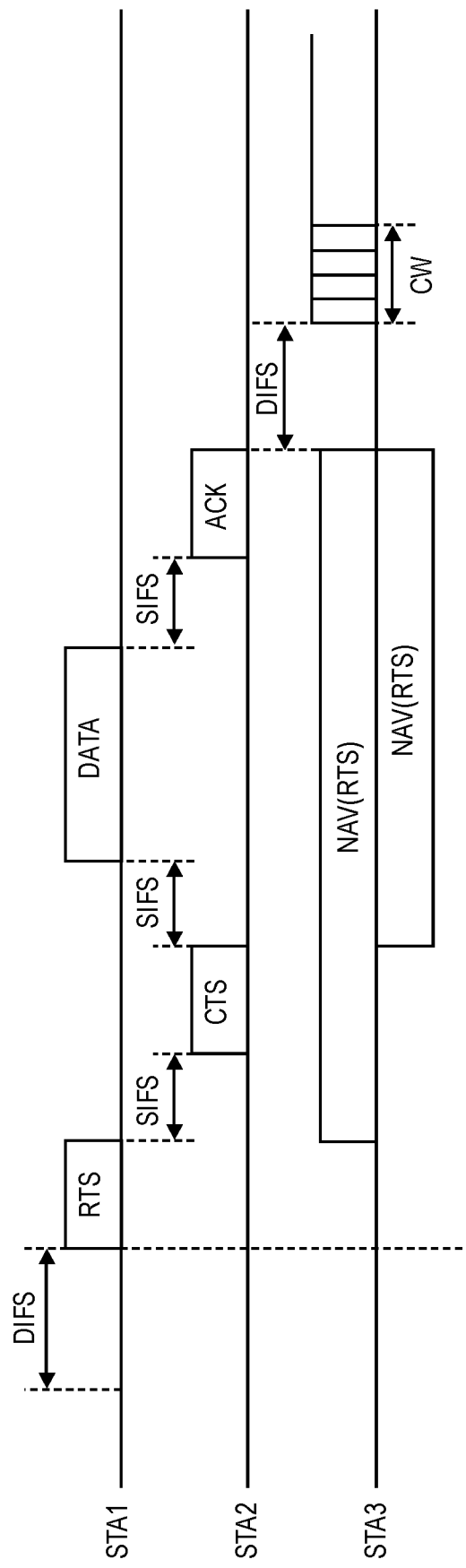
FIG. 8 is a timing diagram providing an example of the carrier sense multiple access/collision avoidance (CSMA/CA) transmission procedure.

FIG. 8 is a timing diagram providing an example of the CSMA/CA transmission procedure. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+ SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

The PHY entity for 802.11 implemented in the WLAN device is based on orthogonal frequency division multiple access OFDM or OFDMA. In either OFDM or OFDMA PHY layers, a STA is capable of transmitting and receiving PPDUs that are compliant with the mandatory PHY specifications. In a PHY specification, set of MCS and maximum number of spatial streams are defined. Also in some PHY entities, downlink and/or uplink MU transmission with a maximum number of space-time streams per user and up to a fix total number of space-time streams is defined.

Figures 9, 10:
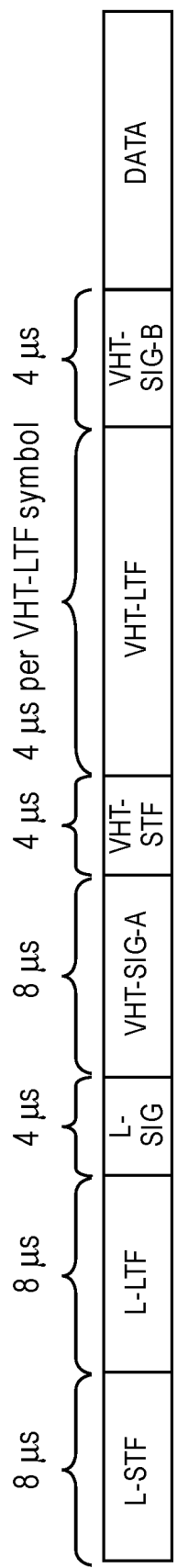
FIG. 9 is a diagram of a very high throughput (VHT) physical layer convergence protocol (PLCP) protocol data unit PPDU utilized by a WLAN device physical layer.
FIG. 10 is a table of the fields of the VHT PPDU.

FIG. 9 is a diagram of a very high throughput (VHT) PPDU utilized by the WLAN device PHY layer. FIG. 10 is a table of the fields of the VHT PPDU. Some PHY entities define PPDU that are individually addressed (where identification is based on AID or Partial AID) and some are group addressed (where identification is based on Group ID, GID). Some PHY entities provide support for 20 MHz, 40 MHz, 80 MHz and 160 MHz contiguous channel widths and support for 80+80 MHz non-contiguous channel width. The data subcarriers are modulated using binary phase shift keying (BPSK), quadrature phase shift keying (QPSK), 16-quadrature amplitude modulation (16-QAM), 64-QAM and 256-QAM. Forward error correction (FEC) coding (convolutional or LDPC coding) is used with coding rates of 1/2, 2/3, 3/4 and 5/6.

In each PHY entity, there would be fields denoted as L-SIG, SGI-A, SIG-B where some crucial information about the PSDU attributes are listed. These symbols are usually encoded with the most robust MCS. The L-SIG, SGI-A, SIG-B have very limited number of bits and it is desired to encode them in the most compact form possible. In a receiving STA, first these symbols are decoded in order to obtain vital information about the PSDU attributes and some MAC attributes. In IEE 802.11ac, these symbols are called VHT SIG-A and VHT SIG-B symbols.

As discussed above, WLAN devices are currently being deployed in diverse environments. These environments are characterized by the existence of many access points and non-AP stations in geographically limited areas. Increased interference from neighboring devices gives rise to performance degradation. Additionally WLAN devices are increasingly required to support a variety of applications such as video, cloud access, and offloading. In particular video traffic is expected to be the dominant type of traffic in many high efficiency WLAN deployments. With the real-time requirements of some of these applications, WLAN users demand improved performance in delivering their applications, including improved power consumption for battery-operated devices.

IEEE 802.11ax or HE SIG-A and IEEE 802.11ax or HE SIG-B are referred to simply as simply by SIG-A and SIG-B and are amendments to the 802.11 standard directed at addressing these problems. Unlike previous amendments where the focus was on improving aggregate throughput, this amendment focuses on improving metrics that reflect user experience, such as average per station throughput, the 5th percentile of per station throughput of a group of stations, and area throughput. Improvements will be made to support environments such as wireless corporate office, outdoor hotspot, dense residential apartments, and stadiums.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

Note the operations of the flowcharts are described with reference to the exemplary embodiments of the diagrams. However, it should be understood that the operations of flowcharts can be performed by embodiments of the invention other than those discussed, and the embodiments of the diagrams can perform operations different than those discussed with reference to the flowcharts.

While the flowcharts in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device in a wireless local area network (WLAN), the method to provide clear channel assessment (CCA) from a physical layer to an upper layer within the network device, the method comprising:
passing at least one piece of data from the physical layer to the upper layer to enable a decision on the state of the wireless medium, wherein the at least one piece of data includes an indication of a conditionally idle state that indicates that a channel of the wireless medium is to be determined idle upon the upper layer determining that a set of conditions are met, including whether
(1) to lower one or more of a transmission power level and a CCA threshold and
(2) that a received frame is from a neighboring device;
adjusting, by the upper layer of the network device, the CCA threshold to produce an adjusted CCA threshold based on a power reduction from a maximum transmission power level of the network device; and
determining the state of the wireless medium based on the adjusted CCA threshold and a signal quality of the received frame.

2. The method of claim 1, further comprising:
measuring the signal quality of the received frame on the wireless channel of the wireless medium;
determining whether the signal quality is above a first threshold; and determining whether the signal quality is above a second threshold.

3. The method of claim 2, wherein passing the at least one piece of data further comprises:
providing the indication of a conditionally idle state for the wireless channel when the signal quality is below the first threshold and above the second threshold.

4. The method of claim 1, wherein the upper layer is a media access control (MAC) layer.

5. The method of claim 1, wherein the at least one piece of data is provided to the upper layer in a state parameter of a physical layer (PHY)-CCA indication primitive, wherein the state parameter indicates that the medium is busy, idle, or conditionally idle.

6. The method of claim 5, wherein a PHY-CCA indication primitive includes a condition list parameter that specifies information for the upper layer to determine a condition of the wireless medium.

7. The method of claim 6, wherein the condition list specifies any one or more of a received signal strength for a channel bandwidth, channel status information of the received frame, target receiver of the received frame, transmitter of the received frame, duration of the received frame or a receiver vector (RXVECTOR).

8. The method of claim 1, further comprising:
determining whether the physical layer is able to decode an orthogonal frequency division multiplexing (OFDM) signal on the wireless medium.

9. The method of claim 1, further comprising:
adjusting, by the upper layer of the network device, the CCA threshold to produce the adjusted CCA threshold based on a transmission bandwidth of a pending frame transmission, wherein determining the state of the wireless medium is based on the adjusted CCA threshold and the signal quality of the received frame.

10. The method of claim 1, wherein adjustment of the CCA threshold is proportional to the power reduction from the maximum transmission power level of the network device.

11. A network device in a wireless local area network (WLAN), the network device configured to implement a method to provide clear channel assessment (CCA) from a physical layer to an upper layer within the network device, the network device comprising:
a non-transitory machine readable medium having stored therein a deferred CCA module; and a processor coupled to the non-transitory machine readable medium, the processor configured to execute the deferred CCA module, the deferred CCA module configured to pass on at least one piece of data to the upper layer to enable a decision on the state of the wireless medium, to adjust, by the upper layer of the network device, the CCA threshold to produce an adjusted CCA threshold based a power reduction from a maximum transmission power level of the network device, and to determine the state of the wireless medium based on the adjusted CCA threshold and a signal quality of a received frame,
wherein the at least one piece of data includes an indication of a conditionally idle state that indicates that a channel of the wireless medium is to be determined idle upon the upper layer determining that a set of conditions are met, including whether
(1) to lower one or more of a transmission power level and a CCA threshold and
(2) that a received frame is from a neighboring device.

12. The network device of claim 11, wherein the processor is further configured to measure the signal quality of the received frame of the wireless channel of the wireless medium, determine whether the signal quality is above a first threshold, and determine whether the signal quality is above a second threshold.

13. The network device of claim 12, wherein the processor is further configured to pass on the at least one piece of data by providing the indication of a conditionally idle state for the wireless channel where when the signal quality is below a first threshold and above the second threshold.

14. The network device of claim 11, wherein the upper layer is a media access control (MAC) layer.

15. The network device of claim 11, wherein the at least one piece of data is provided to the upper layer in state parameter of a physical layer (PHY)-CCA indication primitive.

16. The network device of claim 15, wherein the PHY-CCA indication primitive includes a condition list parameter that specifies information for the upper layer to determine a condition of the wireless medium.

17. The network device of claim 16, wherein the condition list specifies any one or more of a received signal strength for a channel bandwidth, channel status information of the received frame, target receiver of the received frame, transmitter of the received frame, duration of the received frame or a receiver vector (RXVECTOR).

18. The network device of claim 11, wherein the processor is further configured to determine whether the physical layer is able to decode an orthogonal frequency division multiplexing (OFDM) signal on the wireless medium.

19. The network device of claim 11, wherein the processor is further configured to adjust, by the upper layer of the network device, the CCA threshold to produce the adjusted CCA threshold based on a transmission bandwidth of a pending frame transmission, wherein the state of the wireless medium is determined based on the adjusted CCA threshold and the signal quality of the received frame.

20. The network device of claim 11, wherein adjustment of the adjusted CCA threshold is proportional to the power reduction from the maximum transmission power level of the network device.

* * * * *